Nov. 25, 1930.  W. FERGUSON  1,783,078
BUMPING OUT TOOL
Original Filed May 4, 1928   5 Sheets-Sheet 1

INVENTOR:
William Ferguson,
BY Geo. P. Kimmel
ATTORNEY

Nov. 25, 1930.  W. FERGUSON  1,783,078
BUMPING OUT TOOL
Original Filed May 4, 1928   5 Sheets-Sheet 4

INVENTOR
William Ferguson,
BY
ATTORNEY

Nov. 25, 1930.  W. FERGUSON  1,783,078
BUMPING OUT TOOL
Original Filed May 4, 1928   5 Sheets-Sheet 5

Patented Nov. 25, 1930

1,783,078

UNITED STATES PATENT OFFICE

WILLIAM FERGUSON, OF FLINT, MICHIGAN

BUMPING-OUT TOOL

Continuation of application Serial No. 275,215, filed May 4, 1928. This application filed August 30, 1929.
Serial No. 389,565.

This invention relates to bumping-out tools for removing indentations in the metal body of a vehicle such, for instance, as an automobile, and the present application constitutes a continuation of my application Ser. No. 275,215, filed May 4, 1928.

In automobile constructions there is an exterior metal body, back of which is an inner frame or skeleton construction, formed of connected beams and braces of either wood or metal. These beams or braces forming the frame of the automobile body cover up much or most of the inner surface of the metal body, and in order to remove the indentations from the metal body of an automobile or other vehicle, it is now the ordinary practice to remove the inner frame construction which obstructs access to the inner surface of the metal body to be bumped out, and then to place a metal block or dolly against the now exposed interior surface of the sheet metal body and apply blows of suitable character to the exterior of the sheet metal body to remove the indentations and restore the metal body to its initial or desired form.

This method of procedure has absorbed much time, involving great expense, and has necessitated the tearing down of the inner frame construction back of the exterior metal body in order to get access to the inner surface of the latter, as there is not sufficient space between the metal body of an automobile or the like and the inner frame construction to permit the insertion of the hand or arm to hold an anvil or dolly block in position and so, as heretofore practiced, it has been necessary to remove the inner frame structure as above outlined.

One of the important features of the present invention consists in a bumping-out tool of such character that it may be inserted between the metal body of the vehicle or automobile and the inner frame construction without disturbing their assembled relation, with the result that disassembling of parts becomes unnecessary, and indentations may be removed from the metal body without the necessity of removing the adjacent frame or backing structure and the delay and expense involved therein.

In accordance with the present invention the anvil portion of the bumping-out tool is of general blade-like form, that is, of such construction that it may be inserted between the metal body and the inner frame construction, to engage the portion of the surface to be bumped out, and may be held in this position by a handle suitably connected to the anvil, as will more fully appear.

More specifically stated, the anvil is of blade-like structure having extending longitudinally and transversely thereof a curved contour in substantial accordance with the curvature of the portion of the metal body that is to be bumped out, and in order that the anvil may be inserted between the metal body and the inner frame construction, the terminal end portion of the anvil is preferably thinner than the other portions of the anvil, the result being that the relatively thin terminal end may be readily inserted in the small space between the metal body and the inner frame or backing construction without materially displacing either, and thereby forming a passageway for the main portions of the anvil itself.

When the anvil is in place as above stated and rests against the metal body at the portion where the indentation exists, hammer blows of suitable nature are applied to the exterior portion of the sheet metal body, the inner portion of which rests against the anvil, and the indentations are thus readily removed.

Inasmuch as the anvil in many cases may not have its back or end portion resting against a support, such as the inner frame construction, it is desirable that the weight of the tool shall be sufficient to cause the inertia of rest of the tool itself as a whole to withstand the hammer blows necessary to remove the indentations. This weight of the tool, however, is not furnished altogether by the blade-like anvil, because, as above stated the anvil is of generally thin blade-like character to facilitate its insertion between the metal body and inner frame construction; the anvil however possesses sufficient rigidity to withstand the hammer blows.

To meet this condition and furnish the tool with sufficient weight or inertia of rest, the anvil is provided with a handle preferably of greater weight than the anvil itself, so that upon the application of the hammer-like blows to the exterior of the metal body, the inertia of rest of the tool as a whole will withstand the bumping-out operation. As a result of this construction the tool possesses sufficient weight to resist the hammer blow, while a substantial portion of the weight of the tool is provided by the handle which is disposed in spaced relation to the anvil where it is out of the way and does not interfere with the insertion of the anvil between the metal body and inner frame.

The anvil portion of the tool preferably tapers towards the terminal end thereof, thereby furnishing an entering edge at the end of the anvil for insertion between the metal body and its inner frame construction when these parts are in close relation, or to facilitate the insertion of the anvil between the metal body and backing structure against which the sheet metal of the body may rest.

The anvil and its connection with the handle are of sufficient rigidity and of such unyielding nature as to withstand the hammer-like blows in bumping out.

The present invention further resides in a group of differently shaped bumping out tools for use in removing indentations from different portions of the sheet metal structure of an automobile and from different types of automobiles.

That is, it may be necessary at times to remove indentations from various portions of the metal body of an automobile, and the curvature of the different portions of the metal body may differ considerably. Furthermore, some portions of the metal body that may need to be bumped-out may be much more inaccessible than other portions thereof, and the conditions met in removing indentations vary materially in different types of automobiles.

In order to meet these varied requirements the bumping-out tools of the present invention have been carefully designed to meet a maximum number of the different conditions that are met with in removing indentations from the various portions of the metal bodies of different makes of automobiles, and the bumping faces of the different anvils have been given different curves to conform to a maximum number of body curves.

In order to make clear the present invention several of the bumping-out tools of the above mentioned group have been illustrated in the accompanying drawing, and certain uses of these tools in removing indentations from the metal body of an automobile have been illustrated. It will be apparent, however, that bumping-out tools constructed in accordance with the present invention may be given various embodiments other than herein shown and described, and that the tools illustrated may be used to remove indentations from various portions of an automobile other than herein shown.

The invention will be best understood from the following description when read in connection with the accompanying drawings which illustrate good practical forms thereof.

Figures 1, 2, 3, 4, 5, 6, 7:
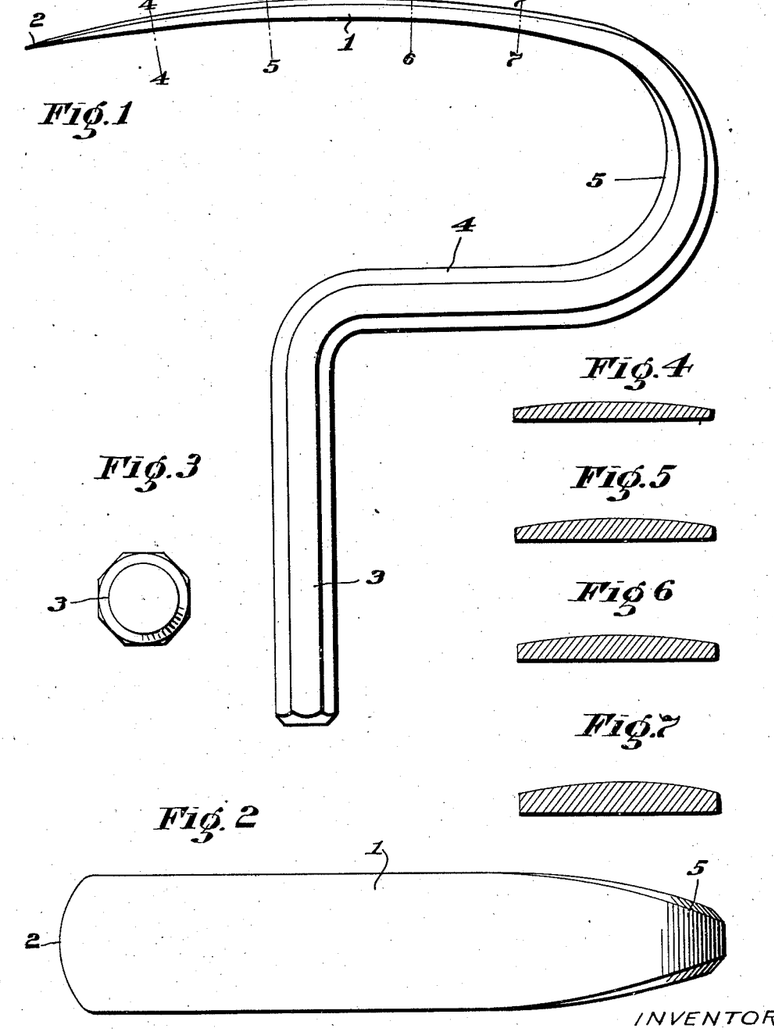
Fig. 1 is a side elevation of a bumping-out tool constructed in accordance with the present invention.
Fig. 2 is a top plan view thereof.
Fig. 3 is an end view of the handle of the tool of Fig. 1.
Figs. 4, 5, 6 and 7 are respectively sections taken on lines 4—4, 5—5, 6—6 and 7—7 of Fig. 1.

The bumping-out tool of Fig. 1 is designed more particularly for use in places where it is necessary to reach inwardly a considerable distance between the inner structure and the metal body of an automobile or other vehicle, and this bumping-out tool is therefore provided with a relatively long blade-like anvil 1 the outer bumping surface of which is curved longitudinally as will be apparent from Fig. 1 and transversely as shown by the sectional views of Fig. 4 to Fig. 7 inclusive.

In the construction of the bodies of most automobiles straight lines are avoided to a large degree, and nearly every part of the exposed metal body of an automobile is curved in either a vertical or horizontal plane, or in both of these planes.

Figures 19, 23:
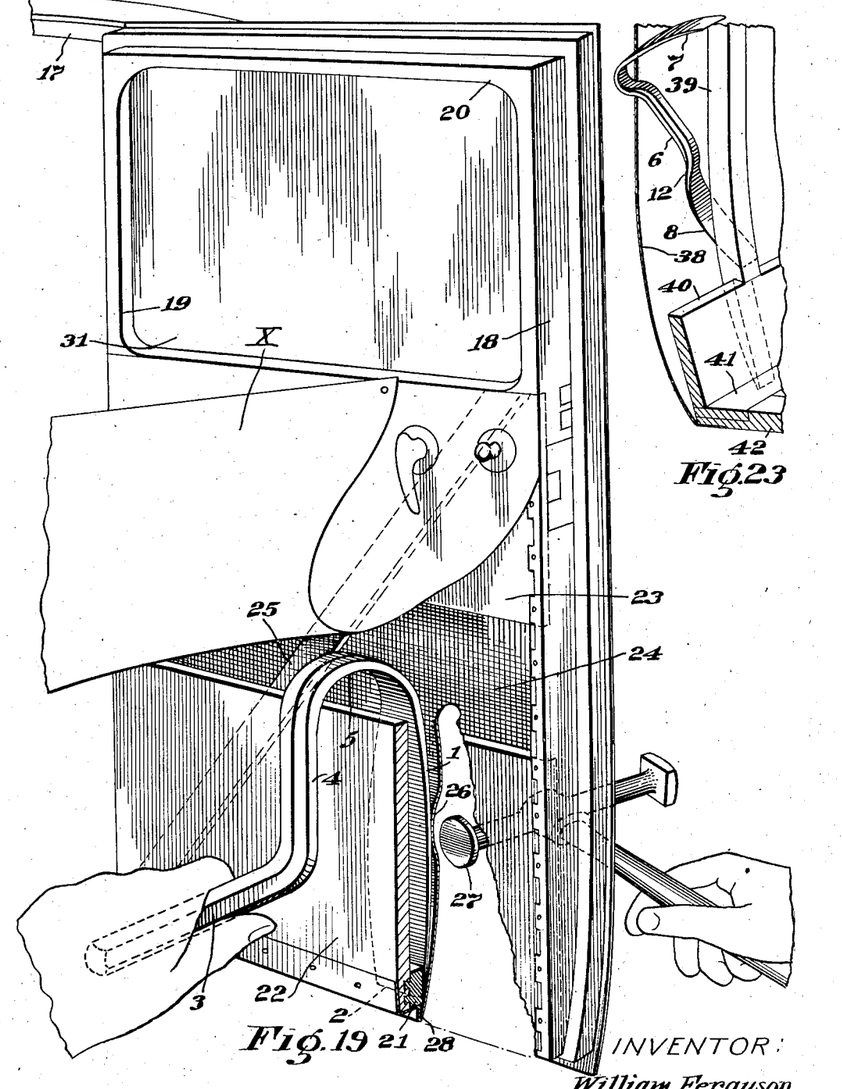
Fig. 19 is a perspective view of the inner face of an automobile door having parts thereof removed, and illustrates the use of the bumping-out tool of Fig. 1 in connection therewith.
Fig. 23 is a view similar to Fig. 22, but shows the tool used while in a diagonal position.

The bumping-out tools of the present invention are therefore designed to conform as far as possible to the various curves of the automobile body upon which they are to be used. The longitudinal curve imparted to the anvil 1 of Fig. 1 will conform more or less accurately to the curvature of the lower portion of the metal wall of the door as shown in Fig. 19, and the transverse curvature of this anvil will cause a rounded instead of a flat surface of the anvil to contact with the portion of the metal body being bumped-out, which is important in removing indentations from a curved surface. Furthermore, the transverse curvature of the anvil 1 will facilitate its use in connection with portions of the body which may curve both longitudinally and transversely, and also when the anvil extends transversely of the body curve.

The anvil 1 is shown as decreasing in thickness from its inner end to its outer end 2 and the end 2 is made relatively thin to facilitate its introduction between two contacting or closely adjacent surfaces, such as the metal body of an automobile and the backing structure or frame against which the metal of the body may rest. The gradual taper imparted to the anvil 1 gives the anvil sufficient rigidity or stiffness to withstand the blows delivered to the outer or bumping face thereof, and also facilitates the introduction of the anvil between two closely adjacent surfaces.

As stated, the anvil may be supported while in engagement with the work by a handle is rigidly secured to the anvil and which is disposed in spaced relation thereto so as not to interfere with the insertion of the blade-like anvil between two closely adjacent surfaces. In the construction shown in Fig. 1 the anvil 1 is provided with a handle 3 which is polygonal in cross-section in order that it may be more firmly gripped in the hand but the particular cross-section configuration of the handle is not important. The handle 3 is connected to the thick or inner end of the anvil 1 by the laterally extending portion 4 and the curved portion 5, the arrangement being such that the handle 3 is disposed in spaced relation to the anvil 1 and opposite the central portion thereof. The anvil shown is of greater width than the handle.

The handle 3 is preferably heavier than the anvil 1, and the gooseneck connection formed by the portions 4 and 5 are sufficiently stiff and rigid to cause the hammer blows imparted to the anvil to be directly transmitted to the handle so that the weight or inertia of rest of the handle and gooseneck will prevent the anvil from being displaced from the inner face of the metal body by the hammer blows during the bumping-out operation. The entire bumping-out tool of Fig. 1 is conveniently formed as an integral structure of steel or other suitable material, and the anvil 1 is tempered to give the same sufficient strength and toughness to withstand the hammer blows and other forces to which it may be subjected.

In the construction of Fig. 1 the handle 3 extends at right angles to the anvil 1 and toward the axis of the radius of the longitudinal curve of the anvil so that blows delivered to any portion of the outer face of the anvil will be transmitted to the handle 3 in more or less of a radial direction, all of which tends to reduce the movement of the anvil away from the work under a hammer blow. Furthermore, the gooseneck connection between the handle and anvil serves to clear the inner frame structure as will be apparent from Fig. 19.

Figures 8, 9, 10, 11, 12, 13, 14:
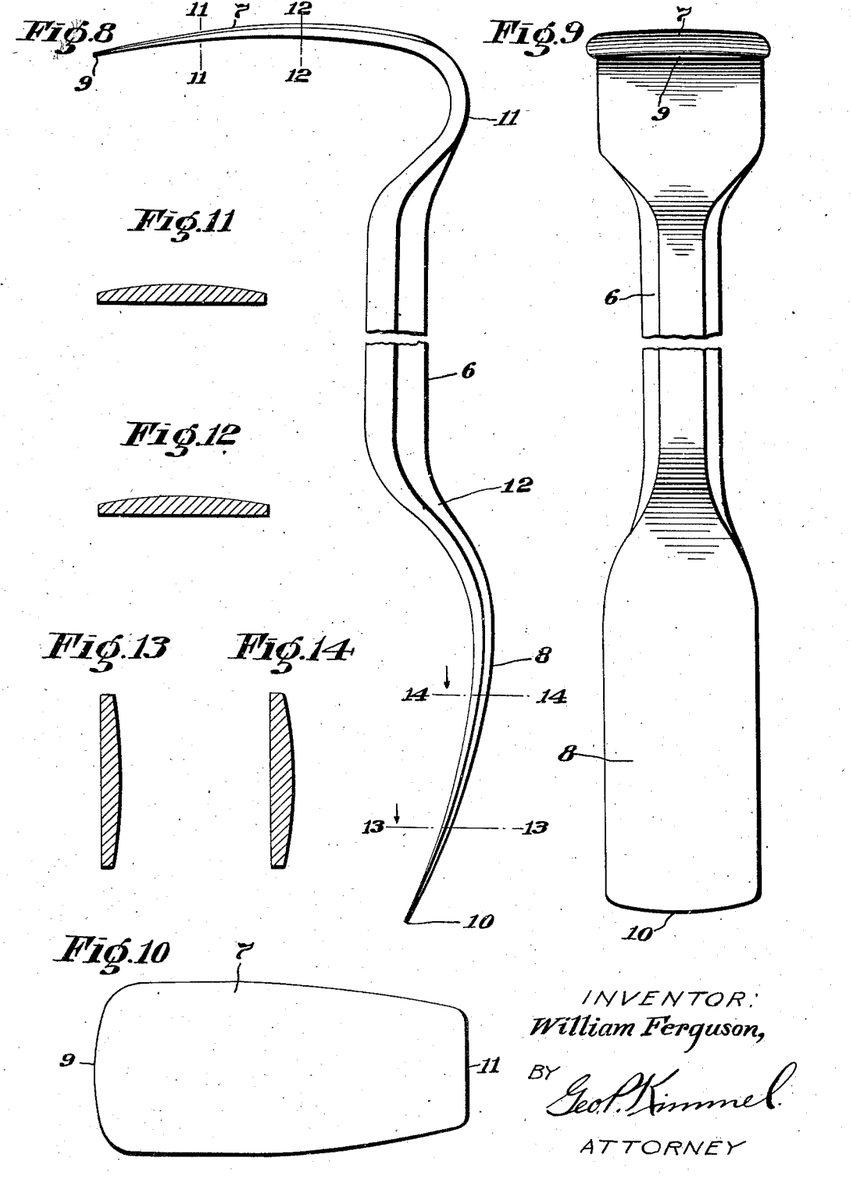
Fig. 8 is a side elevation of a modified form of bumping-out tool.
Fig. 9 is a front elevation thereof.
Fig. 10 is a top view of the tool.
Figs. 11, 12, 13 and 14 are respectively sections taken on lines 11—11, 12—12, 13—13 and 14—14 of Fig. 8.

The tool of Fig. 8 consists of a central bar-like handle 6 which may be either round or polygonal in cross-section and the handle 6 is provided at one end with an anvil 7 that extends approximately transversely to the longitudinal axis of the handle, while at the opposite end of the handle 6 is provided a second anvil 8 which is offset from the longitudinal axis of the handle 6 but extends in a general lengthwise direction with respect to the handle.

The anvil 7 like the anvil 1 tapers from one end toward the other and has its outer bumping surface curved both longitudinally and transversely, but the anvil 7 is not as long as the anvil 1 and it has a greater longitudinal curvature per inch than the anvil 1. The anvil 7 is adapted for use in bumping-out indentations where a shorter anvil than that shown in Fig. 1 will reach the surface to be bumped out. The outer end 9 of the anvil 7 is made sufficiently thin to facilitate its insertion between contacting surfaces and the entire tool is of sufficient length from the anvil 7 to the outer end of the anvil 8 to form a relatively long lever arm by means of which a powerful prying action may be exerted upon the anvil 7 to force the metal body and adjacent inner frame apart.

Figures 20, 21, 22:
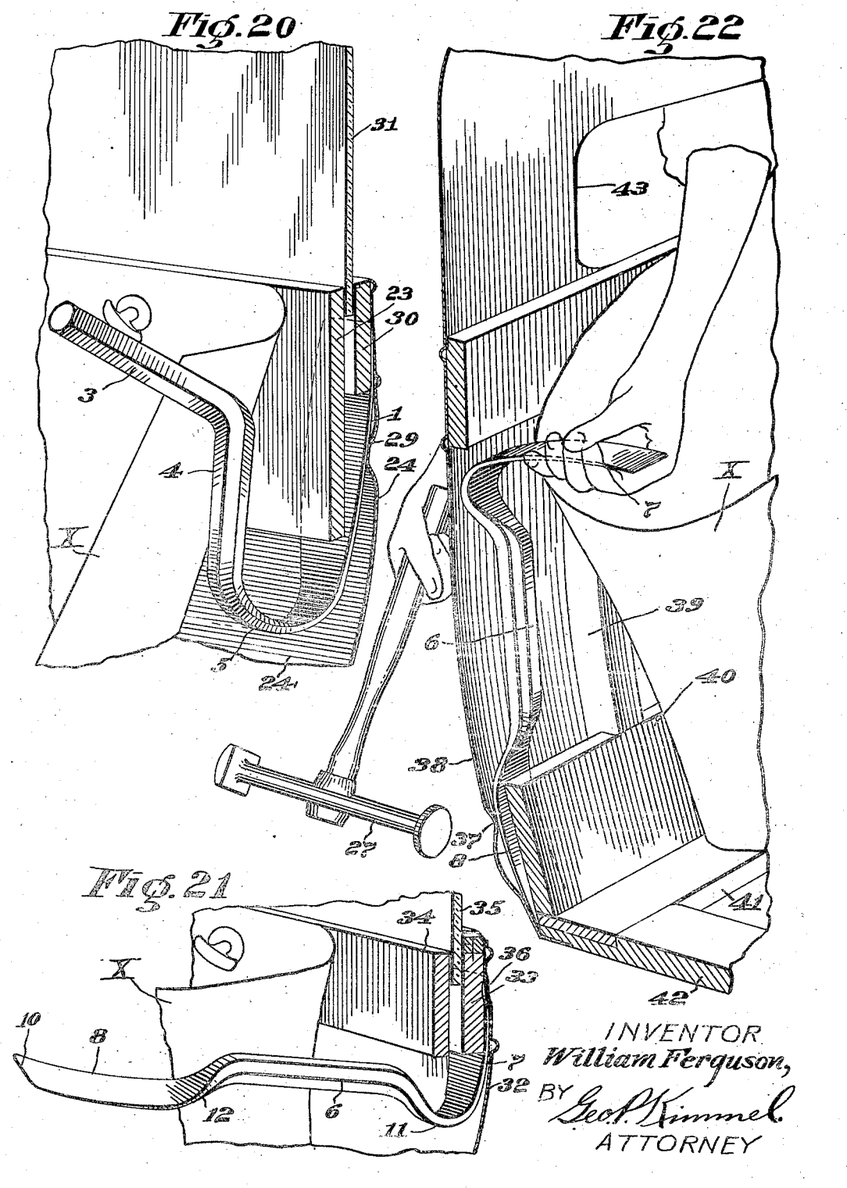
Fig. 20 is a perspective view showing the tool of Fig. 1 associated with a different portion of the door of Fig. 19.
Fig. 21 is a perspective view showing one use of the tool of Fig. 8.
Fig. 22 is a perspective view showing one use of the opposite end of the tool of Fig. 8.

The handle 6 and thick end of the anvil 7 are connected by the rigid gooseneck portion 11 which is curved to clear the inner frame construction as will be apparent from Fig. 21, and the handle lies in spaced relation to an end portion of the anvil 7 and extends at substantially right angles to the anvil.

The blade-like anvil 8 disposed at the opposite end of the handle 6 tapers from one end toward the other and its bumping-out surface is curved both longitudinally and transversely substantially the same as the anvil 7. The anvil 8 is offset from the handle 6 as shown, and it is connected to one end of the handle 6 by the rigid curved portion 12. The anvil 8 is designed more particularly for use in places where it is necessary to reach inwardly between adjacent walls to a greater distance than is permitted by anvils 7 or 1; for example, the anvil 8 is well adapted to be used in removing indentations from the rear wall of an automobile, as will be apparent from Fig. 22.

Figures 15, 17, 18:
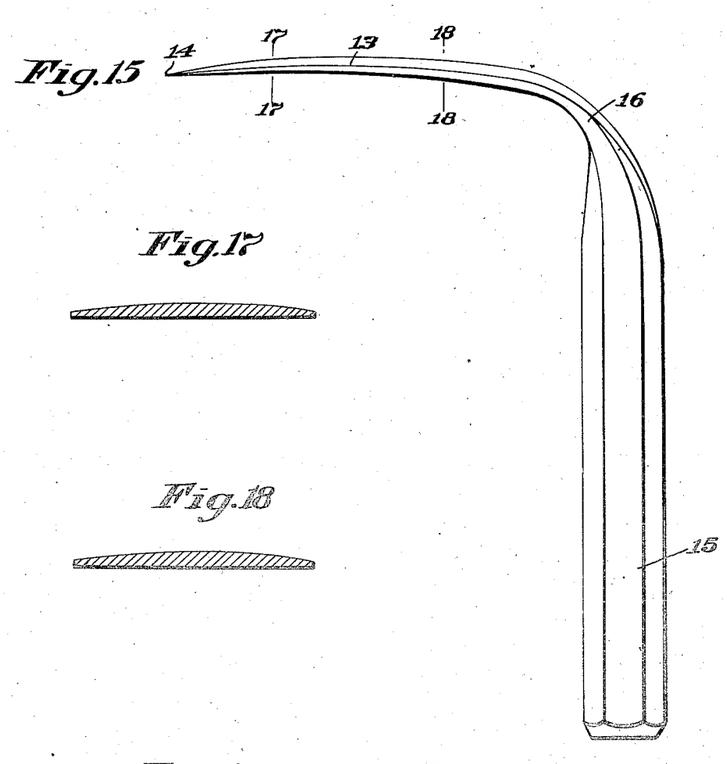
Fig. 15 is a side elevation of another modified form of bumping-out tool.
Figs. 17 and 18 are respectively sections taken on lines 17—17, and 18—18 of Fig. 15.
Figure 16:
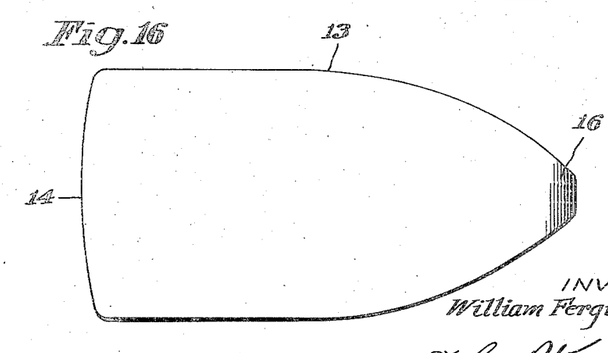
Fig. 16 is a top plan view thereof.

The tool shown in Fig. 15, while adapted for use as a bumping-out tool, is designed more particularly for use as a prying tool for wedging or forcing adjacent surfaces apart. This tool consists of a flattened anvil 13 having a thin end 14 and a handle 15 that is rigidly connected to the anvil by the neck 16.

In each of the tools shown the handle is made relatively heavy and a rigid connection is provided between the anvil and handle to cause the blows delivered to the anvil to be directly imparted to the handle so that the weight or inertia of rest of the latter will prevent the anvil from being dislodged from the work by the hammer blows. Each of the tools described may well be formed as an integral structure out of steel and the anvils are preferably tempered or hardened to the desired degree.

While the foregoing will serve to make clear the construction of the tools illustrated, a further description may be necessary to make clear the use of these tools in removing indentations from various portions of an automobile body, and in this connection reference is had to Figs. 19 to 23 inclusive of the drawings.

In Fig. 19 is shown a portion of the automobile top 17 and a door of usual construction, and the door comprises a frame formed of the spaced uprights termed a lock pillar 18 and hinge pillar 19, and to these pillars are rigidly secured the upper transverse bar 20, lower transverse bar 21, trim board 22 and latch board 23. The door parts just described are rigidly secured together and are extremely difficult to remove and reassemble, but this has frequently been necessary heretofore in removing indentations from the outer metal 24 of the door. It will be apparent from Fig. 19 that the only portion of the inner face of the metal body of the door which is not obstructed by the inner frame structure is that portion lying above the trim board 22 and below the latch board 23, and even access to the inner face of this portion of the metal 24 of the door is partly obstructed by the inclined brace 25.

It is a relatively simple matter to loosen the edge portions of the inner lining or upholstery X so that the upholstery may be held or tacked back as shown in Fig. 19, but after this has been done, indentations can be removed from only a small portion of the metal body frame by using a dolly block. It was therefore necessary prior to the present invention to remove the adjacent inner frame structure of the automobile before an indentation could be bumped out from a portion of the metal body lying opposite such frame construction.

For example, the practice prior to the present invention for removing an indentation positioned in front of the trim board, as indicated by 26 in Fig. 19, was to first remove the board 22 so that a dolly block could be placed against the inner face of the indentation, and then replace the trim board after the indentation had been removed, but, as above stated, the removal of the frame structure is a difficult and time consuming operation.

Through the use of the bumping-out tools of the present invention an indentation may be removed from practically any portion of the metal body of an automobile without the necessity of removing any of the inner frame structure.

It will be clear from Fig. 19 that the bumping-out surface of the anvil 1 can readily be held against the indentation 26 while the same is removed by blows delivered by the hammer 27, and that it is unnecessary to remove the trim board 22 as heretofore in order to perform this bumping-out operation. It will also be clear from Fig. 19, that the end portion of the anvil 1 may be forced down back of the lower transverse bar 21 to the lower folded edge 28 of the metal wall 24 to facilitate the removal of indentations therefrom, and that wherever the indentation may occur the anvil 1 may be held in place by the handle 3 while blows are delivered to the outer face of the metal 24 by the hammer 27 to restore the metal 24 to its original shape.

In Fig. 20 the anvil 1 is shown in place for removing the indentation 29 positioned in front of the latch board 23 of a door. In this case the end of the anvil has been inserted between the metal wall 24 and the door center sill 30 which sill is spaced from the latch board 23 to form a passage for the sliding window 31. It will be apparent from Fig. 20 that since the upper edge part of the metal wall 24 is folded inwardly and nailed or otherwise secured to the inner face of the sill 30, the anvil cannot be inserted downwardly between the sill 30 and metal wall 24 but must be inserted upwardly as shown.

In Fig. 21 the anvil 7 is shown as inserted between the metal body wall 32 of the wheel house panel and the horizontally extending sill 33. Spaced from the sill 33 is a second sill 34 arranged so that the window 35 may slide between them. The sills 33 and 34 are not as wide as the latch board 23 so that the shorter anvil 7 may be used in place of the longer anvil 1 to remove the indentation 36.

Fig. 22 illustrates the use of the anvil 8 in removing an indentation 37 from the lower back panel 38 of the automobile body. The rear end portion of an automobile body is commonly constructed as shown in Figs. 22 and 23 and has the curved uprights or back strainers 39 the lower end portion of which extend downwardly to the floor of the automobile body back of the cushion support board 40, rear cross sill 41 and longitudinal lower sill 42. It will be seen from the manner in which the parts of the automobile body just described are assembled that it is an extremely difficult operation to remove any one of such parts to obtain access to the inner face of the wall 38 of the metal body. Through the use of the tool of Fig. 8 removal of such parts is unnecessary since the anvil 8 can readily be inserted between the board 40 and metal wall 38 to facilitate the removal of the indentation 37, and the tool may be held in place during this operation by the workman who may insert one of his arms through the rear window 43 of the automobile while manipulating the hammer with his other hand. If the indentation to be removed lies back of an upright 39 then the tool may be supported in a diagonal or inclined position as shown in Fig. 23 to facilitate the insertion of the anvil 8 back of the upright 39.

It will be seen from the foregoing that the bumping-out tools of the present invention may be used to remove indentations from various portions of an automobile metal body which are inaccessible to a dolly block, and that through the use of the present tools removal of the inner frame structure is unnecessary.

What is claimed is:—

1. A bumping-out tool for removing indentations in the metal body of a vehicle, comprising a blade-like anvil adapted for insertion between the metal body of the vehicle and its inner frame construction and having a bumping surface to rest against the inner surface of the metal body while the body and frame remain in assembled relation, and a handle connected to the blade-like anvil and disposed opposite the inner face of the anvil that the latter may be inserted into position between the metal body and the inner frame construction and held in place during the bumping out operation.

2. A bumping-out tool for removing indentations in the metal body of a vehicle, comprising a blade-like anvil adapted for insertion between the metal body of the vehicle and its inner frame construction and having a bumping surface extending longitudinally of the blade-like anvil to rest against the inner surface of the metal body while the body and frame remain in assembled relation, a handle, and a curved connection between the handle and the blade-like anvil to position the handle opposite the inner face of the anvil that the latter may be inserted into position between the metal body and the inner frame construction and held in place during the bumping-out operation.

3. A bumping-out tool for removing indentations in the metal body of a vehicle, comprising a blade-like anvil adapted for insertion between the metal body of the vehicle and its inner frame construction and having a bumping surface to rest against the inner surface of the metal body while the body and frame remain in assembled relation, and a handle connected to the blade-like anvil at one end of the anvil and extending at substantially a right angle therefrom that the anvil may be inserted into position between the metal body and the inner frame construction and held in place during the bumping-out operation.

4. A bumping-out tool for removing indentations in the metal body of a vehicle while the metal body and inner frame construction remain in their associated relation, comprising a blade-like anvil diminishing in thickness towards one end to enable the anvil to be inserted between the metal body and its inner frame construction and provided with a bumping surface extending longitudinally of the blade-like anvil to rest against the inner surface of the metal body, a handle, and a gooseneck connection between the handle and the blade-like anvil that the anvil may be inserted between the metal body and the inner frame construction and the handle extending outwardly from the inner frame construction substantially opposite the anvil and be held during the bumping-out operation.

5. A bumping out tool for removing indentations in the metal body of a vehicle while the metal body remains in association with its inner frame construction, comprising an elongated anvil diminishing in thickness longitudinally of the anvil toward one end for insertion of the anvil between the metal body and the inner frame construction and having a curved bumping surface, a handle, and a curved connection between the anvil and handle forming a space between the anvil and handle for receiving the inner frame construction when the anvil is in operative position.

6. A bumping out tool for removing indentations in the metal body of a vehicle while the metal body remains in association with its inner frame construction, comprising an elongated anvil diminishing in thickness longitudinally of the anvil toward one end for insertion of the anvil between the metal body and the inner frame construction and having a curved bumping surface, and a handle connected to the anvil at one end thereof, and extending substantially at right angles to the bumping surface of the anvil.

7. A bumping-out tool for removing indentations in the metal body of a vehicle while the metal body remains assembled with its inner frame construction, comprising an elongated anvil having a bumping surface curved longitudinally and transversely of the elongated anvil and having a thin terminal end adapted for insertion between the metal body and the inner frame construction to present the longitudinally and transversely curved bumping surface against the inner surface of the metal body, and a handle connected to one end of the elongated anvil and disposed opposite the inner face of the anvil so as to oppose the displacing action of the blows upon the anvil and adapted to support the anvil against the metal body during the bumping-out operation.

8. A bumping-out tool for removing indentations in the metal body of a vehicle, comprising a blade-like anvil having a thin terminal end adapted for insertion between the metal body and its inner frame construction and having a bumping surface extending lengthwise of the blade-like anvil, a handle of greater weight than the anvil to resist the blows of the bumping-out operation by its inertia of rest, and a gooseneck connection between the handle and anvil for straddling the inner frame construction with the handle extending at substantially a right angle to the anvil.

9. A bumping-out tool for removing indentations in the metal body of a vehicle, comprising a blade-like anvil having a thin terminal end adapted for insertion between the metal body and its inner frame construction and having a bumping surface extending lengthwise of the blade-like anvil, and a handle of greater weight than the blade-like anvil and connected to one end thereof and extending substantially at right angles to the bumping surface of the anvil that its inertia of rest will resist the blows of the bumping-out operation.

10. A bumping-out tool for removing indentations in the metal body of a vehicle, comprising a blade-like anvil adapted for insertion between the metal body of the vehicle and its inner frame construction and having a curved bumping surface extending lengthwise of the anvil to rest against the inner face of the metal body while the body and frame remain in assembled relation, and a relatively heavy handle disposed at a right angle to the blade-like anvil and rigidly secured to the anvil to cause the blows delivered to the face of the anvil to be transmitted to the relatively heavy handle longitudinally thereof and resisted by its inertia of rest.

11. A bumping-out tool for removing indentations in the metal body of a vehicle, comprising a blade-like anvil adapted for insertion between the metal body of the vehicle and its inner frame construction and having a curved bumping surface extending lengthwise of the anvil to rest against the inner face of the metal body while the body and frame remain in assembled relation, a bar-like handle, and a curved portion between the handle and one end of the anvil positioning the handle with its longitudinal axis disposed at substantially a right angle to the blade-like anvil.

12. A bumping-out tool for removing indentations in the metal body of a vehicle while in assembled relation with its inner frame construction, comprising an anvil having a bumping surface curved longitudinally and transversely in substantial conformity with the part of the metal body to be treated and having a thin blade-like end for insertion of the anvil between the metal body and its inner frame construction, a handle, and a curved gooseneck connection between the handle and one end of the anvil that the anvil may be inserted between the metal body with the inner frame construction in the gooseneck and the longitudinally and transversely curved bumping surface bearing against the inner surface of the metal body.

13. A bumping-out tool for removing indentations in the metal body portion of an automobile while the body and inner frame remain in assembled relation, comprising a blade-like anvil having a thin terminal end to enable the anvil to be inserted between the metal body and the inner frame and bent longitudinally to present a curved longitudinal bumping surface, and a handle connected to the opposite end of the anvil and extending at right angles thereto that the anvil may be held with its longitudinally extending bumping surface bearing against the metal body during the bumping-out operation.

14. A bumping-out tool for removing indentations in the metal body of an automobile while the metal body and inner frame remain in assembled relation, comprising a blade-like anvil adapted to be inserted between the inner face of the metal body and closely adjacent inner frame and having a curved bumping surface for engagement with the inner face of the metal body, a handle for holding the anvil in operative position between said metal body and frame, and a stiff gooseneck connection between the handle and one end of said blade and adapted to extend part way around the adjacent inner frame.

15. A bumping-out tool for removing indentations in the metal body of an automobile while the metal body and inner frame remain in assembled relation, comprising a blade-like anvil constructed to be inserted between the inner face of the metal body and the closely adjacent supporting frame, and a handle of greater weight than the blade-like anvil and connected to the anvil by a curved coupling portion to lie opposite and in spaced relation to the inner face of the blade-like anvil.

16. A bumping-out tool for removing indentations in the metal body of an automobile while the metal body and inner frame remain in assembled relation, comprising a one-piece metal tool consisting of an elongated blade-like anvil adapted to be inserted between the inner face of the metal body and closely adjacent inner frame and having a relatively heavy handle disposed opposite the inner face of the anvil and rigidly attached to one end of the anvil by a curved coupling portion formed so that said adjacent inner frame may lie between the anvil and handle during the bumping-out operation.

17. A bumping-out tool for removing indentations in the metal body of an automobile while the metal body and inner frame remain in assembled relation, comprising an elongated blade-like anvil adapted to be inserted between the inner face of the metal body and adjacent inner frame and having a handle of greater weight than the anvil disposed opposite and in spaced relation to the inner face of the anvil and connected to one end of the anvil by a rigid gooseneck portion.

18. A bumping-out tool comprising a handle, a curved coupling portion extending from each end of the handle, and an anvil provided at each end of the handle and connected to the handle by said coupling portions so that the anvils are disposed at approximately right angles to each other.

19. A bumping-out tool comprising a handle, a curved coupling portion extending from each end of the handle, an elongated anvil provided at each end of the handle and connected to the handle by said coupling portions so that the anvils are disposed at an angle to each other, and each of said anvils having a curved bumping surface.

20. A bumping-out tool comprising a handle, a coupling portion extending from each end of the handle, and a blade-like anvil provided at each end of the handle and connected to the handle by said coupling portions so that the anvils are disposed in different relation to the longitudinal axis of the handle.

21. A bumping-out tool for removing indentations in the metal body of an automobile, comprising, a relatively heavy handle, a coupling portion extending from each end of the handle, a blade-like anvil provided at each end of the handle and rigidly connected to the handle by a coupling portion, and each of said anvils being disposed at a different angle to the handle and adapted for insertion between the metal body of the automobile and its inner frame construction and having a curved bumping surface.

22. A bumping-out tool for removing indentations in the metal body of an automobile, comprising a bar-like handle having a blade-like anvil rigidly secured to each end of the handle so that the anvils are disposed in different relation to the longitudinal axis of the handle, and each blade-like anvil being adapted for insertion between the metal body of the automobile and its inner frame construction and having a bumping surface extending lengthwise of the anvil.

In testimony whereof, I have signed my name to this specification.

WILLIAM FERGUSON.